United States Patent [19]
Fox et al.

[11] Patent Number: 5,878,558
[45] Date of Patent: Mar. 9, 1999

[54] TRACTOR MOUNTED HARVESTER WITH QUICK ATTACH STRUCTURE

[75] Inventors: Jeffrey Robert Fox, Minburn; Timothy Arthur Deutsch, Newton, both of Iowa

[73] Assignee: Deere & Company, Moline, Ill.

[21] Appl. No.: 815,765

[22] Filed: Mar. 12, 1997

[51] Int. Cl.[6] .................................................. A01D 24/03
[52] U.S. Cl. ............................ 56/14.7; 56/14.9; 56/15.6
[58] Field of Search ............................. 56/15.6, 28, 14.9, 56/218, 228, 1, 2; 460/21, 119

[56] References Cited

U.S. PATENT DOCUMENTS

| | | | |
|---|---|---|---|
| 3,802,022 | 4/1974 | Fleming | 56/228 |
| 4,348,856 | 9/1982 | Copley et al. | 56/30 |
| 4,483,131 | 11/1984 | Schlueter | 56/15.6 |
| 5,029,436 | 7/1991 | Fredrikson | 460/21 |
| 5,519,988 | 5/1996 | Copley et al. | 56/30 |
| 5,601,486 | 2/1997 | Schlueter | 56/28 |
| 5,609,523 | 3/1997 | Ringwald | 460/119 |
| 5,707,073 | 7/1998 | Stuker | 280/665 |

OTHER PUBLICATIONS

J. I. Case Company, Case brochure entitled "500 Brush Cotton Strippers", 6 pages, no date, published in the U.S.A.

Primary Examiner—Thomas B. Will
Assistant Examiner—Arpad Fabian Koracs

[57] ABSTRACT

Mounting structure attaching a cotton harvester to a tractor includes a pair of rear subframe support members that attach one to a side directly to the tractor and are designed for the specific tractor to which the harvester will be mounted. A second group of parts of standard design includes frame members with two rear support posts that align with the rear frame support members. A self-aligning pocket on the lower end of each of the posts and a pair of tapered bushings rigidly fixed to each post above the pocket releasibly secure the rear support posts to the rear frame support members. The rear support posts carry rear mounted harvesting units. Another group of parts provides front harvester support with a post design which is easily and quickly attachable to and removable from the tractor frame. Screw-type jack stands lift the harvester from attaching points on the tractor and allow the tractor to be driven out from under the harvester basket.

19 Claims, 4 Drawing Sheets

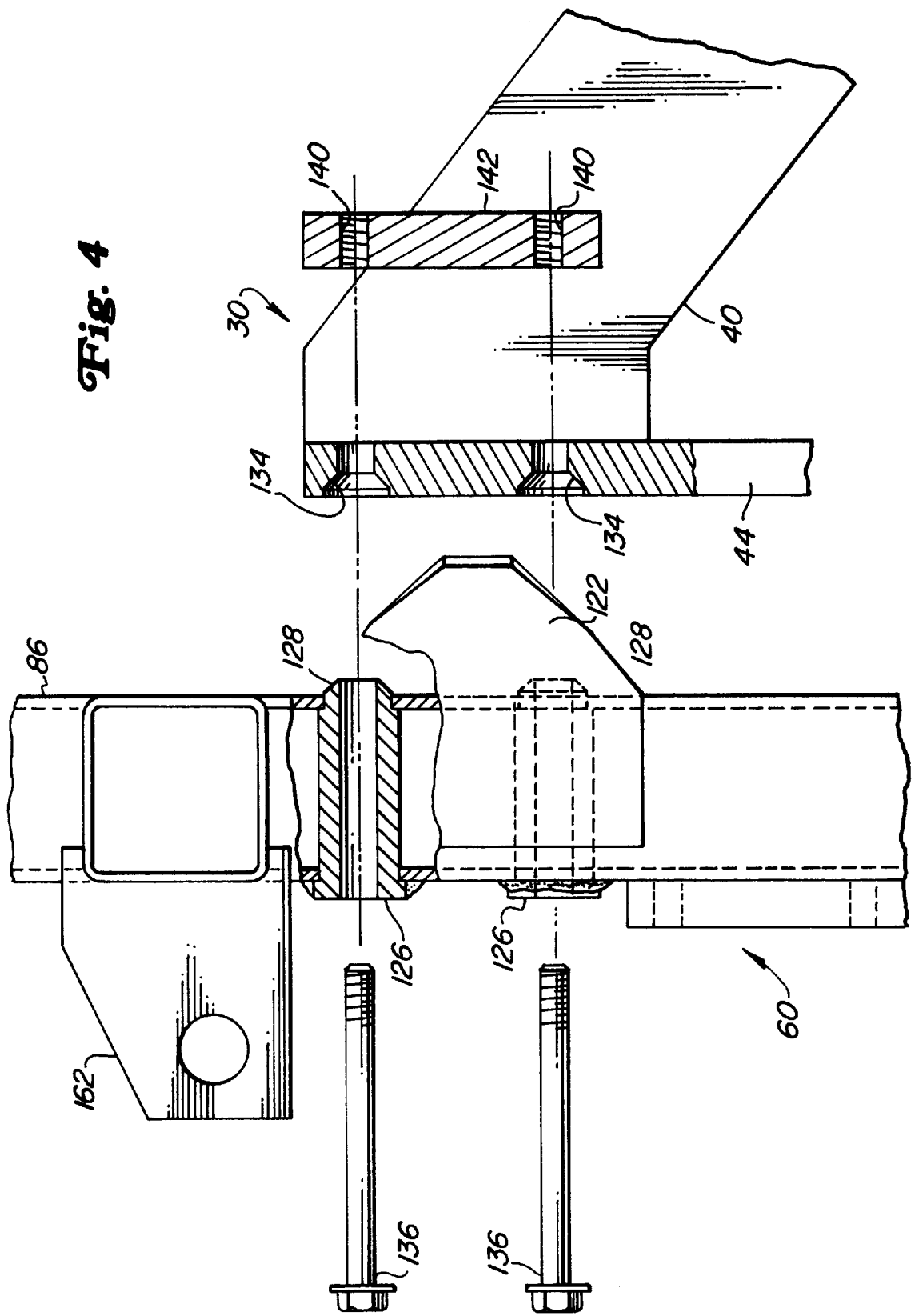

TRACTOR MOUNTED HARVESTER WITH QUICK ATTACH STRUCTURE

BACKGROUND OF THE INVENTION

1) Field of the Invention

The present invention relates generally to tractor mounted harvesters, and, more specifically, to structure for attaching an implement such as a cotton harvester with rear mounted row units to a tractor.

2) Related Art

Previously available tractor mounted cotton harvesters have included those with one or more picker row units mounted forwardly of the tractor drive wheels. Other types of mounted pickers have included row units supported on the rear of a tractor modified to normally run in the reverse direction. More recently, rear mounted harvesting units have been devised for the rear of a tractor so the tractor can operate in the conventional forward manner. An example of such a unit is shown in U.S. Pat. No. 5,519,988 which is assigned to Deere & Company and shows cotton picker units mounted for harvesting cotton planted in very narrowly spaced rows. An earlier stripper type of cotton harvester mounted on the rear of a tractor is shown in Deere & Company's U.S. Pat. No. 4,348,856; various structures have been devised for mounting and dismounting a rear tractor mounted harvester, an example of such a structure is shown in U.S. Pat. No. 4,483,131 which is also assigned to Deere & Company. Although these harvesters permit the tractor to be used for purposes other than harvesting, mounting and dismounting the harvesters are often difficult and time-consuming tasks.

Another problem with previously existing rear, tractor mounted harvesters is difficulty in adapting the harvester for use on tractors of different designs. Although a mounting structure may work well for one tractor type, a different tractor type may require a redesigned or extensively modified structure and mounting procedure. Therefore, providing a simple and easy to use design that is readily adaptable to many different types of structure without extensive modifications to the structure and mounting procedure has been a continuing problem. The problem is further complicated by the need to adapt the harvester to a variety of tractors made in different countries and with different design criteria.

BRIEF SUMMARY OF THE INVENTION

It is therefore an object of the present invention to provide improved mounting structure for a tractor mounted harvester. It is yet another object to provide such structure which overcomes most or all of the aforementioned problems.

It is a further object of the present invention to provide improved mounting structure for a tractor mounted harvester which allows the tractor to be used for purposes other than harvesting. It is another object to provide such a structure wherein the procedure for attachment and removal from the tractor is simplified when compared to at least most previously available structures. It is yet another object to provide such a structure wherein the attaching and removal procedure is substantially the same for a variety of tractors.

It is another object of the present invention to provide improved mounting structure for a tractor mounted harvester, particularly a rear mounted cotton harvester, having a support post design facilitating quick attachment and removal of the harvester. It is a further object to provide such a structure including a first rear frame assembly designed specifically for and connected to the tractor, and a second frame assembly connected to the harvester and adapted for easy attachment to and removal from the first frame.

It is another object to provide a quick attach frame for a tractor for relatively quick attaching and removal of a rear-mounted harvester, wherein the frame is simple in construction and accommodates mounting of the harvester on a variety of different tractors.

It is still another object to provide improved mounting structure for a tractor mounted harvester including overhead basket structure, wherein the harvester and basket can be removed using a simple procedure. It is still another object to provide such a mounting structure which supports the basket structure and permits the tractor to be driven out from under the machine.

In accordance with the above objects, mounting structure includes three groups of parts including, first, a pair of rear frame support members that attach one to a side directly to the tractor and are designed for the specific tractor to which the machine will be mounted. A second group of parts of a standard single design includes frame members with two rear support posts that align with the rear frame support members. A self-aligning pocket on the lower end of each of the posts and a pair of tapered bushings rigidly fixed to each post above the pocket by bolts releasibly secure the rear support posts to the rear frame support members. The rear support posts carry rear mounted harvesting units such as cotton picker row units. The third group of parts provides front machine support with a four-post design which is easily and quickly attachable to and removable from the tractor. Four screw-type jack stands lift the machine from attaching points on the tractor and support the weight of machine to allow the tractor to be driven out from under the machine during removal and to be backed under the machine during attachment. The design of the mounting structure is relatively simple, easy to use, and easily adaptable to most all types of tractors. The time required to mount the machine and to remove the machine to again free up the tractor for uses other than harvesting is greatly reduced over that of most previously available tractor mounted harvesters.

These and other objects, features and advantages of the present invention will become apparent to one skilled in the art upon reading the following detailed description in view of the drawings.

BRIEF DESCRIPTION OF THE DRAWINGS

FIG. 4 is an enlarged view of a portion of the subframe and harvester frame, partially in section, showing connector bushing and guide structure.

DETAILED DESCRIPTION OF THE DRAWINGS

Figure 1:
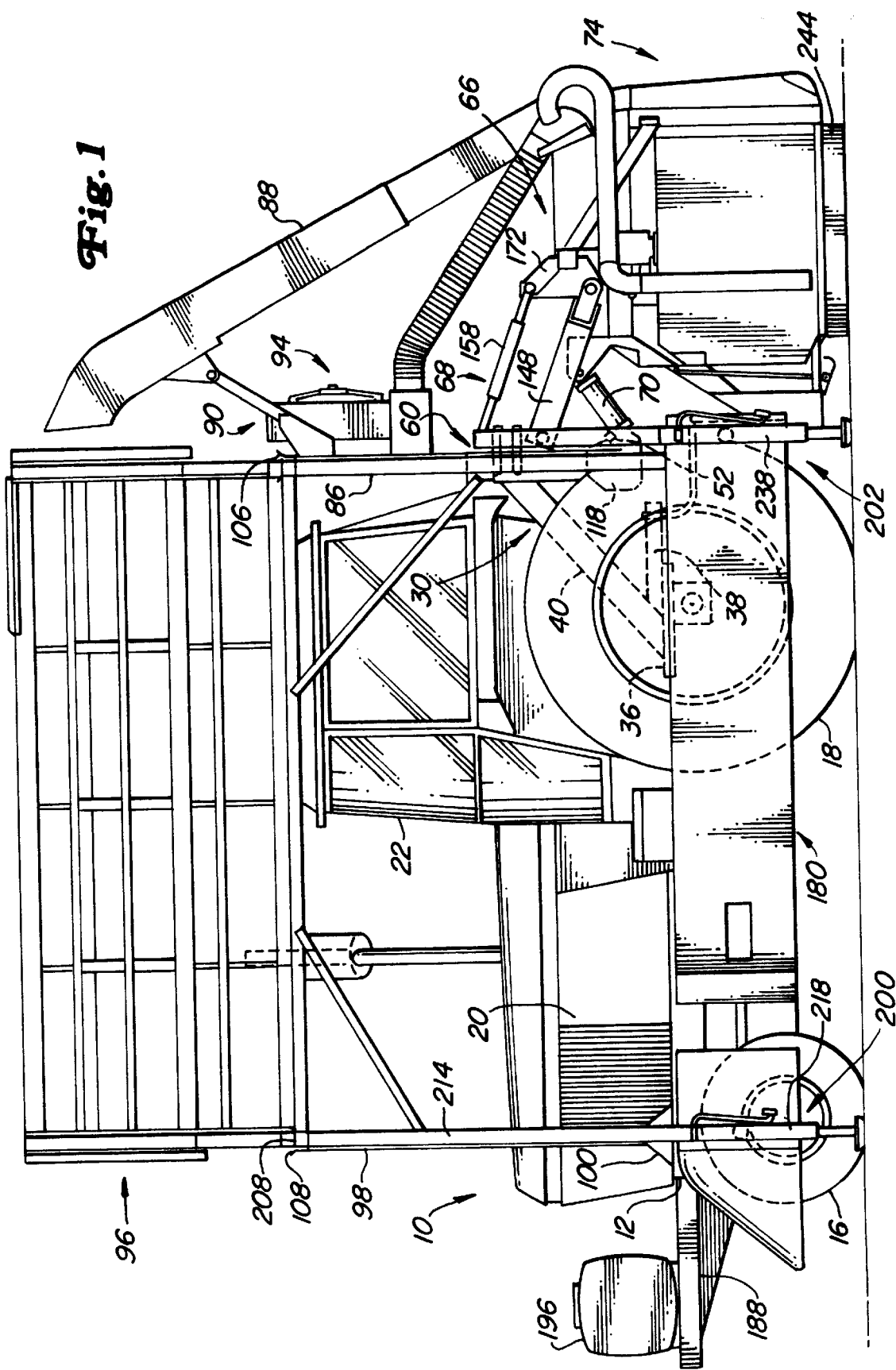
FIG. 1 is a side view of a tractor with a rear mounted harvester and with the jack stand structure in place for removal of the harvester.

Referring now to FIG. 1, a tractor 10 includes a fore-and-aft extending main frame 12 supported by front wheels 16 and rear drive wheels 18 for forward movement over a field having a crop such as cotton planted in parallel rows. A forward engine compartment 20 and an cab 22 located behind the compartment are supported on the frame 12.

Figure 2:
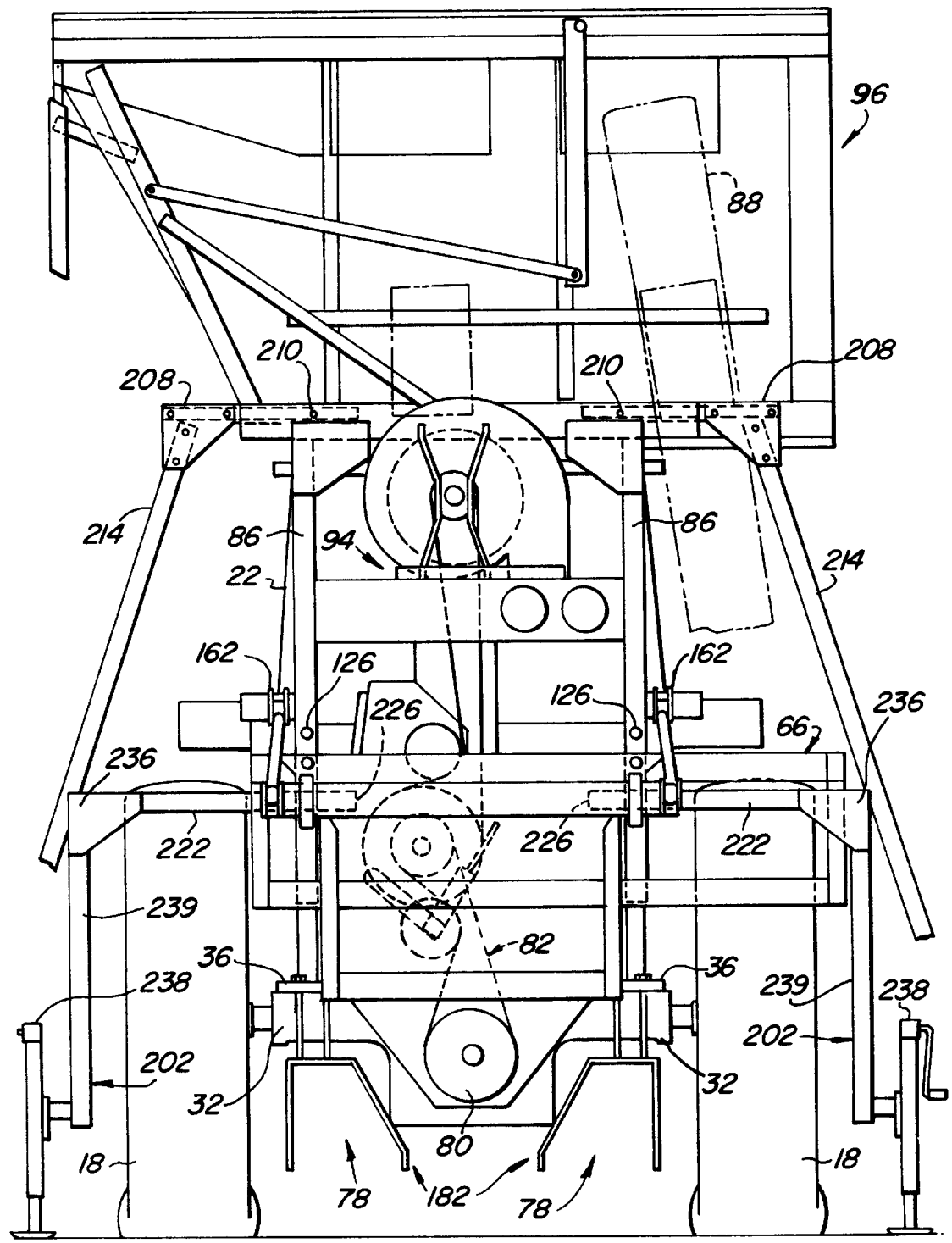
FIG. 2 is a rear view of the tractor and harvester of FIG. 1 with row units removed to more clearly show the mounting structure.
Figure 3:
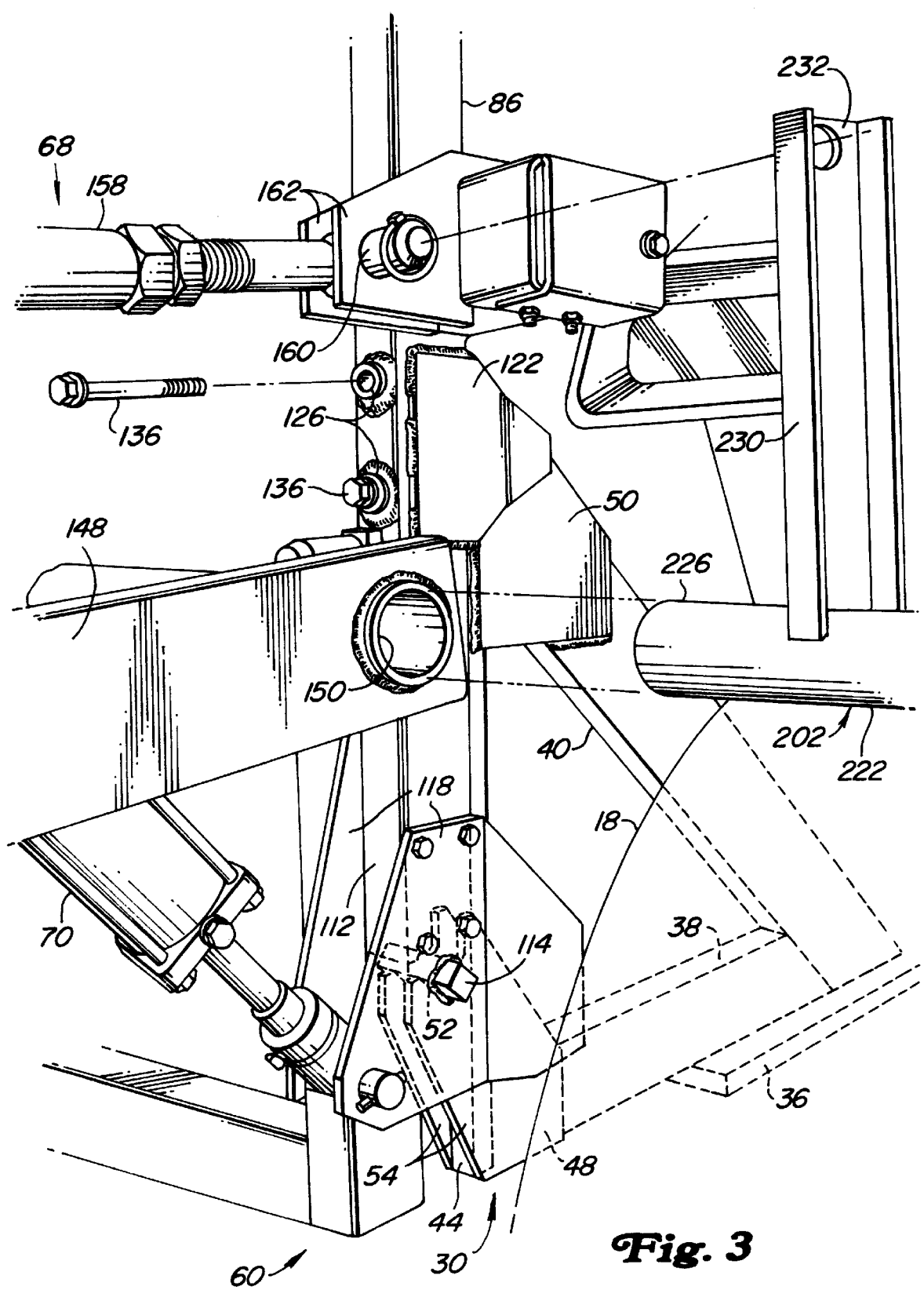
FIG. 3 is an enlarged isometric view showing a portion of the rear post support arrangement for the tractor and harvester of FIG. 1.

An upright subframe or tractor-mounted support frame 30 is fixed to the main frame 12 adjacent rear axle areas 32 (FIGS. 2 and 3). The support frame 30 is connected by brackets 36 to the tops of the axle housings on opposite sides of the tractor centerline and includes fore-and-aft extending, generally horizontal lower beams 38 and upwardly directed diagonal beams 40 extending rearwardly from the brackets 36. The beams 38 and 40 terminate generally at an imaginary upright transverse plane that passes through the aft extremities of the wheels 18. A pair of upright supports or posts 44 extend vertically between the aft ends of the beams 38 and 40. Gussets 48 and 50 connect the lower and upper ends of the posts 44 to the beams 38 and 40, respectively.

At the lower end of each of the posts 44, an upwardly opening saddle 52 (FIG. 3) is defined by a pair of rearward projections 54 on the gusset 48. The subframe 30 is designed to fit a specific type of tractor 10, but the aft portion of the subframe including the posts 44 and the saddles 52 is substantially identical for any tractor type to accommodate an upright secondary or harvester frame 60 which is of a single design not dependent on the tractor type. Therefore, only one harvester frame is required, with differing tractor types accommodated by simply providing a subframe 30 with beam and bracket structure that is adapted for each tractor type.

The harvester frame 60 supports a lift frame 66 (FIG. 1). Four-bar linkage structure 68 extends between the lift frame 66 and the frame 60. Hydraulic lift cylinders 70 extending between the lower portion of the frame 60 and the linkage structure 68 move the frame 66 vertically. Narrow row harvesting units 74 are supported on the frame 66 and are transversely adjustable on the frame for alignment with rows of cotton passing through shielded channels 78 under the tractor frame. A sheave 80 is connected to the tractor power take off (PTO) and to a drive 82 which powers the row units.

The harvester frame 60 includes upright support structure or posts 86 projecting upwardly behind the cab 22. Cotton ducts 88 for each of the row units 74 are supported from the upper portions of the posts 86 by bracket assemblies 90. A fan assembly 94 is also supported from the upper portions of the posts 86 and is powered from the drive 82 to provide air to convey cotton from the units 74 through the ducts 88 to a basket 96 located above the tractor 10. The rear portion of the basket 96 is supported from the upper ends of the posts 86. The forward portion of the basket 96 is supported at the upper ends of forward basket posts 98 connected to the front of the tractor frame 12 by brackets 100 located on opposite sides of the engine compartment 20. Rear and forward transversely extending basket support channels 106 and 108 are connected between the upper ends of the respective posts 86 and 98 to facilitate lowering of the basket 96 into position above the tractor 10 during initial assembly of the harvester.

The structure 86 includes lower ends 112 (FIG. 2) cradled in the saddles 52 of the subframe 30 to facilitate rocking of the structure between mounted and detached (FIG. 4) positions using the cylinders 70 as described in detail below. A short traverse bar 114 of square cross section extends through cylinder bracket and guide plates 118 bolted to opposite sides of each lower end 112. The bar 114 is adapted for support in the saddle 52 defined by the rearward projections 54. The forward extremities of the plates 118 diverge in the forward direction to help channel the lower ends 112 into alignment with the lower end of the support frame 30 during assembly. A second set of guide plates 122 (FIG. 3) are fixed to the structure 86 above the plates 118 and also diverge in the forward direction to help guide the harvester frame posts into alignment with the upper ends of the subframe posts 44 adjacent the gussets 50 as the structure 86 is rocked forwardly about the saddles 52. As best seen in FIG. 4, fore-and-aft extending bushings 126 are welded to the structure 86 and include forwardly facing tapered ends 128 which are received in mating flared bores 134 located in the upper ends of the posts 44 of the tractor-mounted subframe 30. As the structure 86 is rocked forwardly about the saddles 52, the guide plates 122 direct the tapered ends 128 into the flared ends of the bores 134. Mounting bolts 136 are then positioned through the bushings 126 and the bores 134 and tightened into threaded bores 140 of a securing plates 142 positioned against aft faces of the posts 44 to secure the structure 86 against the posts 44. The bushings 126 not only help guide the structure 86 into position but also help support the harvester frame 60 and reduce shear loads on the bolts 136.

The four bar linkage structure 68 includes transversely spaced lower lift arms 148 connected by pivots 150 to the frame 60 just below the bushings 126. Transversely spaced stabilizing links 158 are connected by quick lock pivot pins 160 and brackets 162 to the structure 86. The aft ends of the arms 148 and links 158 are pivotally connected to bracket structure 172 on the lift frame 66 to maintain the desired attitude of the row units 74 relative to the ground as the lift frame is raised and lowered by actuation of the cylinders 70 during operation of the harvester in the field.

Shield structures 180 (FIG. 1) and 182 (FIG. 2) are connected to the tractor 10 to protect rows of cotton plants as they pass under and along the side of the tractor. The aft portions of the shield structures 180 and 182 are preferably supported from the subframe brackets 36. The structures 78 define the plant channels 78. A liquid tank 186 is supported from the forward end of the frame 12 by support structure 188.

As best seen in FIGS. 1 and 2, removable front and rear jack stand and support structures 200 and 202 are selectively attachable to the harvester and basket structure to facilitate simple attachment and removal of the harvester relative to the tractor 10. The front structures 200 include a pair of mounting assemblies 208, each slidably received within one front side portion of the support weldment for the basket 96 and pinned thereto by a bolt 210. A diagonal brace 214 extends downwardly and outwardly from each assembly 208 to a connection with a jack stand 218 with a telescoping portion for raising and lowering the basket support weldment.

The rear structures 202 each include a transversely extending upper member 222 with a tubular innermost portion 226 (FIG. 3) which is slidably received within the pivot 150. A stabilizing channel 230 includes a lower end fixed to the portion 226 and an apertured upper end 232 which is pinned to the bracket 162 by the pin 160 to prevent rotation of the structure 202 relative to the frame 60. The member 222 extends outwardly past the side of the rear wheel 18, to a connection at 236 with a vertical leg having a lower end connected to a rear jack stand 238.

To remove the harvester, pallets 244 (FIG. 1) are place under the row units 74 and the cylinders 70 are retracted until the weight of the units is fully supported by the pallets. The front support structures 200 are then attached to the front of the basket weldment and the pins 210 are installed. The braces 214 are installed between the assemblies 208 and the jack stands 218. The rear structure are then installed by inserting the end portions 226 within the pivots 150 and securing the upper ends 232 of the stabilizing channels 230 with the pins 160. The telescoping portions of the jack stands 218 and 238 are lowered until the stands support a portion of the weight of the harvester. The PTO shaft is disconnected from the main drive sheave 80. The two bolts 136 are removed from each side of the support posts so the harvester frame 60 may be released from the tractor-mounted subframe 30 by rocking the frame 60 slightly rearwardly about the saddles 52. The front basket support posts 98 are disconnected from the channel 108, and the front of the basket is raised with the jack stands 218 until the channel 108 will clear the top of the tractor cab 22. The rear jack stands are then operated to raise the machine until the positioning bars 114 at the lower ends of the rear posts clear the subframe support saddles 52. After relieving any pressure in hydraulic lines connected to the cylinders 70, the hydraulic lines are disconnected from the tractor. The fluid line from the tank 186 and any wiring harnesses and the like are then disconnected at the rear of the cab 22. The tractor 10 then is simply driven forwardly out from under the machine which remains supported by the structures 200 and 202 and the pallets 244. The procedure is reversed to again mount the machine on the tractor.

Having described the preferred embodiment, it will become apparent that various modifications can be made without departing from the scope of the invention as defined in the accompanying claims.

We claim:

1. A mounting assembly for selectively connecting a harvester to a fore and aft extending frame of a tractor, the mounting assembly comprising:
   an upright support frame fixed to the aft end of the tractor frame;
   an upright harvester frame supporting at least one row harvesting unit and movable relative to the upright support frame between a detached position and an attached position;
   a row unit support frame;
   a fore-and-aft extending lift linkage having rearward ends connected to the row unit frame and forward ends connected to the upright harvester frame;
   the upright support frame and upright harvester frame including a saddle portion for cradling a portion of the harvester frame relative to the upright support frame;
   means for rocking the harvester frame relative to the support frame about the saddle portion between the detached position and the attached position; and
   a connector for securing the harvester frame to the upright support frame in the attached position.

2. The invention as set forth in claim 1 wherein the upright support frame includes bracket structure connecting the support frame to the aft end of the tractor frame, the bracket structure accommodating one particular type of tractor frame, and wherein one harvester frame is adapted to fit the bracket structure for a plurality of types of tractor frames so that a single harvester frame can be mounted on a variety of tractor types.

3. The invention as set forth in claim 1 including a bushing connected to the harvester frame and a mating aperture in the support frame, wherein the bushing is tapered for alignment with the mating aperture as the harvester frame is rocked toward the attached position.

4. The invention as set forth in claim 1 wherein the support frame includes an upwardly opening pocket defining the saddle portion, and the lower end of the harvester frame includes a member received in the pocket.

5. The invention as set forth in claim 4 further including a guide urging the harvester frame into alignment with the support frame as the harvester frame is pivoted about the cradled end.

6. The invention as set forth in claim 3 wherein the connector extends through the bushing and the bushing supports the harvester frame to reduce shear loads on the connector.

7. The invention as set forth in claim 1 wherein the harvester frame extends upwardly above the support frame to a support end, and a crop receptacle connected to the support end above the tractor.

8. The invention as set forth in claim 1 wherein the mounting assembly further comprises at least two upright posts connected to the tractor frame forwardly of the support frame, the upright posts supporting a fore-and-aft extending crop receptacle above the tractor frame, and forward jack structure connectible to the fore end of the crop receptacle for raising the crop receptacle and facilitating driving of the tractor away from under the crop receptacle.

9. The invention as set forth in claim 8 further comprising rear jack structure selectively attachable to the harvester frame for supporting the aft end of the crop receptacle as the tractor is driven away from under the receptacle.

10. A cotton harvester for mounting on a tractor, the tractor having a fore-and-aft extending frame supported by front and rear wheels for forward movement over a field of parallel rows of cotton plants, the harvester comprising:
    row units for removing crops from the rows;
    a harvester frame supporting the row units and including a fore-and-aft extending lift linkage;
    a support frame connected to the tractor and releasibly supporting the harvester frame behind the rear wheels;
    wherein the harvester frame and support frame include mating first and second post portions, respectively, the first post portions adapted for support by the support frame, and the second post portions matingly received by the first post portions and pivotally connected to the foreward end of the lift linkage; and
    further comprising a cradling portion located at the lower end of the first post portions and a mating member located at the lower end of the second post portions, and means for rocking the second post portions relative to the first post portions about the cradling portion between a detached position wherein the second post portions are offset from the first post portions, and an attached position wherein the first and second post portions are in close proximity and aligned with each other.

11. The invention as set forth in claim 10 further comprising a connector assembly including a tapered bushing securing the first and second post portions together in the attached position.

12. The invention as set forth in claim 10 wherein the means for rocking the second post portions comprises a hydraulic cylinder connected to the harvester frame and operable to move the row units vertically relative to the tractor frame when the harvester frame is in the attached position, the cylinder operable to rock the harvester frame between the detached and attached positions.

13. The invention as set forth in claim 10 further comprising guide means connected between the first and second post portions for moving the post portions into alignment as the portions are rocked from the detached position to the attached position.

14. The invention as set forth in claim 10 further comprising a harvester basket and upright basket posts connected to the tractor frame and supporting the basket above the tractor, and jack stand structure for raising the basket relative to the tractor frame thereby facilitating the driving of the tractor out from under the basket.

15. The invention as set forth in claim 14 wherein the jack stand structure includes a support member selectively attachable to the harvester support frame.

16. The invention as set forth in claim 15 wherein the rear harvester frame includes row unit support arms connected by a pivot to the second post portions, and the jack stand structure includes an attaching member extending through the pivot.

17. A cotton harvester for mounting on a tractor, the tractor including a fore-and-aft extending frame supported by transversely spaced wheels for forward movement over the ground, the cotton harvester including:

a support frame connected to the aft end of the tractor frame and including transversely spaced upright subframe members;

a harvester frame including transversely spaced, upright frame members and a fore-and-aft extending lift frame having a forward end pivotally connected to the upright frame members and an aft end;

at least one row harvesting unit supported from the aft end of the lift frame behind the tractor frame; and attaching structure for selectively connecting the upright frame members to the upright subframe members and comprising a saddle member connected to a lower end of the subframe members and a guide structure, located above the saddle member for aligning the upright frame members with the upright subframe members as the upright frame members are attached to the subframe members.

18. The invention as set forth in claim 17 wherein the attaching structure comprises a saddle member connected to a lower end of the subframe members and guide structure located above the saddle member for aligning the upright frame members with the upright subframe members as the upright frame members are attached to the subframe members.

19. The invention as set forth in claim 17 including a hydraulic cylinder connected to the harvester frame and operable to move the lift frame and row harvesting unit vertically relative to the tractor when the upright frame members are connected to the upright subframe members, the cylinder also operable during attaching of the upright frame members to rock the upright frame members about a transverse axis into alignment with the subframe members.

* * * * *